United States Patent [19]
Arvidsson et al.

[11] Patent Number: 5,170,460
[45] Date of Patent: Dec. 8, 1992

[54] QUASI-PHASE-MATCHED OPTICAL WAVEGUIDES AND METHOD OF MAKING SAME

[76] Inventors: Gunnar Arvidsson, Kristinebergsvägen 12, S-112 44; Fredrik Laurell, Rörstrandsgatan 38, S-113 40; Jonas Webjörn, Västerlånggatan 57, S-111 29, all of Stockholm, Sweden

[21] Appl. No.: 678,304
[22] PCT Filed: Oct. 25, 1989
[86] PCT No.: PCT/SE89/00595
§ 371 Date: Jun. 24, 1991
§ 102(e) Date: Jun. 24, 1991
[87] PCT Pub. No.: WO90/04807
PCT Pub. Date: May 3, 1990

[30] Foreign Application Priority Data
Oct. 25, 1988 [SE] Sweden ................ 8803818

[51] Int. Cl.$^5$ .............. G02B 6/10; H01L 21/265; H03F 7/00
[52] U.S. Cl. ............ 385/129; 385/14; 385/122; 385/131; 437/20; 437/21; 437/26; 437/51; 437/134; 437/153; 359/326; 359/332
[58] Field of Search ........... 385/14, 122, 40, 129, 385/130, 131, 1; 437/51, 20, 21, 26, 27, 36, 134, 153; 359/326, 328, 330, 332

[56] References Cited

U.S. PATENT DOCUMENTS

| | | | |
|---|---|---|---|
| 3,842,289 | 10/1974 | Yariv et al. | 359/332 |
| 5,006,285 | 4/1991 | Thackara et al. | 385/132 |
| 5,007,694 | 4/1991 | Yamamato et al. | 359/326 |
| 5,028,107 | 7/1991 | Bierlein et al. | 359/332 |
| 5,028,109 | 7/1991 | Lawandy | 359/332 |
| 5,036,220 | 7/1991 | Byer et al. | 385/122 |
| 5,052,770 | 10/1991 | Papuchon | 359/332 |
| 5,058,970 | 10/1991 | Schildkraut et al. | 359/328 |
| 5,075,796 | 12/1991 | Schildkraut et al. | 385/122 |
| 5,076,658 | 12/1991 | Hayden et al. | 385/1 |
| 5,113,473 | 5/1992 | Yoshida et al. | 359/332 |

*Primary Examiner*—Brian Healy
*Attorney, Agent, or Firm*—Pollock, Vande Sande & Priddy

[57] ABSTRACT

A waveguide in optically nonlinear materials for quasi-phase-matched frequency conversion of electromagnetic waves, arranged in a crystal substrate. The waveguide includes a periodically alternating crystal orientation necessary for quasi-phase-matching. The crystal orientation is provided in the form of a periodically domain inverted structure of ferroelectric domains, with reversed crystal orientation in relation to intermediate regions located between the domains. The domain structure is achieved by use of a periodic mask structure applied to the surface of the substrate in combination with a subsequent heat treatment of the substrate.

13 Claims, 1 Drawing Sheet

QUASI-PHASE-MATCHED OPTICAL WAVEGUIDES AND METHOD OF MAKING SAME

FIELD OF THE INVENTION

The present invention relates to waveguides (for quasi-phase-matched frequency conversion) in optically non-linear materials such as $LiNbO_3$, $LiTaO_3$ and $KTiOPO_4$ and a method for fabrication of such waveguides.

BACKGROUND OF THE INVENTION

It is well known that, in optically non-linear materials, light or other kinds of electromagnetic radiation of certain wavelength can be converted to light or other kinds of electromagnetic radiation of another wavelength. This conversion can be in the form of frequency doubling, sum frequency generation, difference frequency generation, parametric amplification, parametric oscillation, etc., utilizing the so-called second order optical non-linearity. For the conversion to be efficient, so-called phasematching has to be achieved. A problem is, however, that in all homogenous, optically non-linear materials with a uniform structure, the phase-matching condition can only be fulfilled within a rather limited wavelength interval, if it can be fulfilled at all. Another problem associated with conversion is that for conventional non-linear optical materials and methods, the intensity in the light from the pump source has to be high for the efficiency of the frequency conversion to be acceptable.

One way of achieving efficient frequency conversion is to use so-called quasi-phase-matching, thereby making the crystal orientation vary periodically in the optically non-linear material so that the non-linearity changes its sign with the same period. The method implies that when the interacting waves have come 180 degrees out of phase and no longer interact constructively, the crystal structure is altered so that the waves continue to interact constructively.

Crystal structure variation has been realized in the form of plate stacks and in the form of crystals grown in such a way that the crystal orientation alters periodically during the growth. Both methods, however, are complicated and expensive.

Further, it is known that by coupling the light/radiation into a waveguiding layer or channel, one can achieve a high radiation intensity over a long interaction length, thereby reducing the demands on the intenstity of the pump source. This means that low power lasers can be used for frequency conversion. Examples of materials in which waveguides with low optical losses can be fabricated are $LiNbO_3$, $LiTaO_3$ and $KTiOPO_4$.

SUMMARY OF THE INVENTION

The purpose of the present invention is to realize waveguides in a simple and inexpensive way, with such a periodically altered crystal structure so that quasi-phase-matching can be obtained, in order to achieve efficient frequency conversion of desired wavelengths from lasers with low output powers, such as semiconductor lasers.

The invention provides solutions to the above described problems as summarized below. Here it is assumed that a waveguide for electromagnetic waves is provided in an optically non-linear crystal substrate, e.g., $LiNbO_3$, $LiTaO_3$ or $KTiOPO_4$. According to the invention, the waveguide passes a periodically domain-inverted structure, with periodically inverted crystal orientation, arranged in the surface of the crystal substrate. The regions with inverted crystal orientation (and thereby opposite sign of the non-linearity) are realized in the form of ferroelectric domains of opposite ferroelectric polarity with respect to the intermediate regions. The invention is characterized in that this periodically domain-inverted structure is obtained by means of a heat treatment of the substrate that previously has been furnished with a periodic perturbation in the surface layer, achieved by use of a periodic mask structure.

The periodically domain-inverted structure according to the invention is preferably produced by a method characterized in that a periodic mask structure consisting of metal or dielectric is applied to the surface of the crystal substrate by known techniques, and that a heat treatment is performed up to a temperature slightly below the Curie temperature of the substrate, during which the periodic mask structure governs an alteration of the domain orientation in the surface layer of the crystal. The method can in certain cases bring about that a waveguide is formed at the same time. As an alternative, a waveguide passing through the periodically domain-inverted structure can be fabricated afterwards.

BRIEF DESCRIPTION OF THE DRAWINGS

The invention is described more closely below, with reference to the FIGS. 1 and 2.

DETAILED DESCRIPTION OF THE INVENTION

Figure 1:
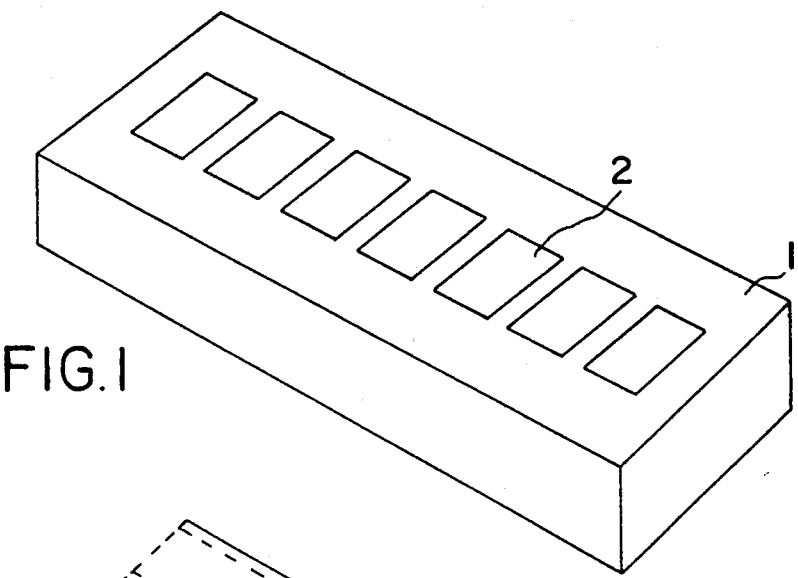
FIG. 1 shows a substrate furnished with a mask structure of metal or dielectric.
Figure 2:
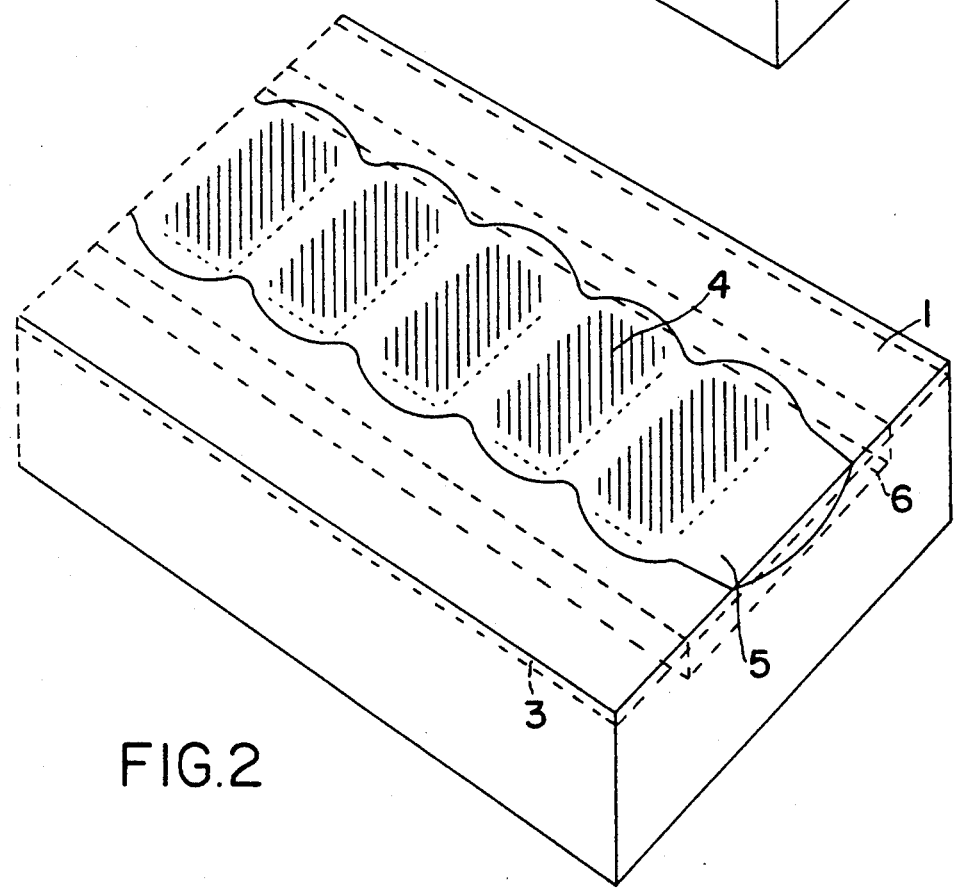
FIG. 2 shows an example of the domain structure and the refractive index variation in a finished component according to the present invention.

In one preferred embodiment shown in FIGS. 1 and 2, on the substrate 1, for instance made out of $LiTaO_3$, $KTiOPO_4$ or c-cut $LiNbO_3$, a pattern of a masking material 2 has been applied according to known technique. This mask constitutes or is used in order to achieve a periodic perturbation in the surface layer of the substrate, which during the heat treatment governs the domain inversion.

The invention is based on observations that have been made during waveguide fabrication in $LiNbO_3$, where domain inversion has been reported as a problem. By our technique, this normally disturbing phenomenon can instead be used for the fabrication of a quasi-phase-matching structure in a waveguide.

One embodiment of the invention is based on the fact that domain inversion has been reported to occur in a surface layer on the $c^+$ face of c-cut $LiNbO_3$, induced by titanium indiffusion.

Another (second) embodiment of the invention is based on the fact that domain inversion has been reported to occur spontaneously in a surface layer on the $c^+$ face of c-cut $LiNbO_3$ during heat treatments up to a temperature slightly below the Curie temperature, without any added substances present. We have found that this type of domain inversion can be prevented locally by a deposition of metal or dielectric on the surface.

During the method corresponding to the second embodiment of the invention (embodiment 2), there is a ferroelectric domain inversion taking place in a thin layer in the c+-surface, except in the parts of the surface essentially covered by the mask. FIG. 2 shows how such a thin ferroelectrically domain-inverted layer has been achieved everywhere 3 except in those parts 4 corresponding to the mask structure. In this embodiment of the invention domain-inversion is suppressed in the coated areas and by means of the heat treatment a domain inverted layer is achieved in the uncoated areas. The domain-inversion is influenced by time, temperature and combination of materials. The temperature T should be in the interval $T_c - 300 < T < T_c$ (degrees Celsius) where $T_c$ is the Curie temperature of the substrate. In this form of domain inversion in $LiNbO_3$, outdiffusion of $Li_2O$ from the surface of the crystal, mainly from the uncoated parts, contributes to the periodic perturbation that governs the domain-inversion. In this embodiment of the invention, metal as well as dielectric can be used as mask material.

For the first mentioned embodiment of the invention (embodiment 1) the opposite is true: the domain inversion takes place in the regions of the surface layer of the crystal that correspond to the extent of the mask (i.e. the regions 4 of FIG. 2). This will, however, give the same end result as regards quasi-phase-matching. The temperature T should also in this case be in the interval $T_c - 300 < T < T_c$ (degrees Celsius) where $T_c$ is the Curie temperature of the substrate. In this embodiment a metal is preferably used as mask material, which during the heat treatment diffuses into the substrate, and domain inversion occurs in the indiffused regions.

When using a metal such as titanium as mask material on $LiNbO_3$, either of the above mentioned embodiments of the invention can be achieved, depending on the choice of processing parameters.

For both of the two embodiments mentioned, the mask structure, that governs the domain-inversion during the heat treatment, can also consist of one or more substances of metals such as Ti, Li, Nb, Ta, V, Ni, Sc, Y, Cr, In, Fe, Ga, and of dielectrics such as SiC, $SiO_2$, $Si_3N_4$, MgO etc.

In a third embodiment of the invention, a periodic mask is used to restrict an ion exchange process to a series of delimited regions in the surface layer of the substrate. The ion exchange process (especially the so-called proton-exchange process for $LiNbO_3$ and $LiTaO_3$) is well known technology e.g. for production of waveguides in this type of crystals and means that primarily protons are introduced into $LiNbO_3$ and $LiTaO_3$ substrates and primarily Cs, Rb or Tl are introduced into $KTiOPO_4$. Subsequently a heat treatment is performed up to a temperature slightly below the Curie temperature, during which the substance introduced by the ion exchange process governs the domain inversion.

In a fourth embodiment of the invention, a periodic mask is used to restrict an ion implantation by known methods to a series of delimited regions in the surface layer of the substrate, primarily an ion implantation of He, N, Ne, Ar, Ti, O, Mg, Li, Cr, Nb, or Ta in $LiNbO_3$, $LiTaO_3$ or $KTiOPO_4$. After that a heat treatment is performed up to a temperature slightly below the Curie temperature, during which the substance introduced by the ion implantation governs the domain inversion.

The third and fourth embodiments are both varieties of the previous embodiments in that ion exchange or ion implantation is used to introduce one of the above mentioned substances into the surface layer of the substrate instead of as in the previous embodiments use diffusion.

A fifth embodiment of the invention is a variety of the fourth embodiment with the difference that the parameters of the ion implantation are chosen in such a way that the crystal structure itself is affected, and that this periodic perturbation of the crystal structure is very essential for the occurance of domain inversion during the following heat treatment up to a temperature slightly below the Curie temperature.

All these embodiments of the invention are characterized in that a periodic mask structure on the surface of the crystal constitutes or is used in order to achieve a periodic perturbation in the surface layer of the substrate, which gives rise to a periodic domain inversion during a heat treatment to a temperature slightly below the Curie temperature.

In certain cases, e.g. by the use of a titanium mask on $LiNbO_3$, a substance, introduced into the substrate in connection with the fabrication of the periodically domain inverted structure, can give rise to an increase of the refractive index. This can be used to achieve a waveguide, a region with higher refractive index than the index of the surroundings, that guides the light. Thus it is possible by the proper choice of material and geometry of the mask to achieve the waveguiding channel itself as well as the periodic crystal structure that is arranged in the channel to achieve a quasi-phase-matching structure. An index profile 5 for this case has been illustrated in FIG. 2. The waveguiding channel is denoted 6.

If, in other cases, the demands on the combination of geometrical parameters, material combinations and temperature parameters are such that a change or a sufficient change of the refractive index to achieve a channel waveguide cannot be obtained during fabrication of the periodically domain-inverted structure, or if it is found advantageous for other reasons, the waveguide can be defined afterwards using some known low-temperature process, e.g. proton exchange, without affecting the domain structure. The channel waveguide is denoted 6 in FIG. 2.

The form and dimensions of the deligned regions 4 are chosen according to known techniques with respect to the wavelength of the light/radiation, the modal structure of the waveguide 6, the criteria for quasi-phase-matching, etc. Normally the regions 4 are shaped as rectangles, but naturally any shape can easily be given to the mask 2.

We claim:

1. A waveguide in optically nonlinear materials for quasi-phase-matched frequency conversion of electromagnetic waves, arranged in a crystal substrate comprising a periodically alternating crystal orientation necessary for quasi-phase-matching provided in said waveguide in the form of a periodically domain inverted structure of ferroelectric domains, with reversed crystal orientation in relation to intermediate regions located between said domains, said domain structure being achieved by use of a periodic mask structure applied to the surface of the substrate in combination with a subsequent heat treatment of the substrate.

2. A device according to claim 1, wherein the optically nonlinear crystal substrate consists of $LiNbO_3$, $LiTaO_3$ or $KTiOPO_4$.

3. A method for fabrication of a waveguide in optically nonlinear materials for quasi-phase-matched frequency conversion of electromagnetic waves arranged in a crystal substrate comprising:

a) application of a metallic or dielectric periodic mask structure to a surface of the substrate;

b) application of a heat treatment of the substrate at a temperature slightly below the Curie temperature $T_c$, preferably in the interval $T_c - 300 < T < T_c$; and c) thereby causing the introduction of a periodically domain inverted structure of ferroelectric domains with reversed crystal orientation in relation to intermediate regions located between said domains.

4. A method according to claim 3, wherein said periodic mask structure on the surface of the crystal substrate is used, prior to the heat treatment, to restrict an ion implantation or an ion exchange process of a substance to a series of delimited regions in a surface layer of the substrate which are not covered by the mask structure.

5. A method according to claim 3, wherein a) the applied mask structure includes at least one member selected from the group consisting of Ti, Li, Nb, V, Ni, Sc, Y, Cr, In, Fe, Ga, Ta, SiC, $SiO_2$, $Si_3N_4$, or MgO and mixtures thereof;

b) the mask structure diffuses into the substrate during said heat treatment; and c) the diffusing of the mask structure results in an increase of the refractive index which is used to achieve the waveguide.

6. A method according to claim 4, wherein a) a substance is introduced into the substrate by means of ion implantation or ion exchange b) resulting in an increase of the refractive index which is used to achieve the waveguide.

7. A method according to claim 3, wherein the applied mask structure includes at least one member selected from the group consisting of Ti, Li, Nb, V, Ni, Sc, Y, Cr, In, Fe, Ga, Ta, SiC, $SiO_2$, $Si_3N_4$, or MgO and mixtures thereof.

8. A method according to claim 4, wherein the substance introduced into the substrate by means of ion exchange or ion implantation includes at least one member selected from the group consisting of H (protons), Rb, Cs, Tl, or any other material that may be used to fabricate waveguides by ion exchange in an optically nonlinear crystal substrate.

9. A method according to claim 4, wherein the ion implanted substance includes at least one member selected from the group consisting of He, N, Ne, Ar, Ti, O, Mg, Li, Cr, Nb or Ta.

10. A method according to claim 3, wherein the waveguide is defined after the heat treatment by a low-temperature process.

11. The method according to claim 10, wherein the low-temperature process includes proton exchange, which does not influence the domain structure.

12. A method according to claim 4, wherein the waveguide is defined after the heat treatment by a low-temperature process.

13. The method according to claim 12, wherein the low-temperature process includes proton exchange, which does not influence the domain structure.

* * * * *